(12) United States Patent
Tanaka

(10) Patent No.: US 8,995,682 B2
(45) Date of Patent: Mar. 31, 2015

(54) HOWLING CANCELLER

(75) Inventor: Ryo Tanaka, Hamamatsu (JP)

(73) Assignee: Yamaha Corporation (JP)

( * ) Notice: Subject to any disclaimer, the term of this patent is extended or adjusted under 35 U.S.C. 154(b) by 436 days.

(21) Appl. No.: 13/383,871

(22) PCT Filed: Jul. 14, 2010

(86) PCT No.: PCT/JP2010/061922
§ 371 (c)(1),
(2), (4) Date: Jan. 13, 2012

(87) PCT Pub. No.: WO2011/007812
PCT Pub. Date: Jan. 20, 2011

(65) Prior Publication Data
US 2012/0114141 A1 May 10, 2012

(30) Foreign Application Priority Data

Jul. 17, 2009 (JP) .................................. 2009-168558

(51) Int. Cl.
*H04B 15/00* (2006.01)
*H04M 9/08* (2006.01)
*H04R 3/02* (2006.01)

(52) U.S. Cl.
CPC *H04M 9/082* (2013.01); *H04R 3/02* (2013.01)
USPC ........................................ 381/94.1; 381/71.1

(58) Field of Classification Search
USPC ........ 381/94.1, 83, 66, 58, 92, 59, 94.2, 71.1, 381/61, 93, 103, 95, 96; 379/406.05, 379/406.08, 388.07
See application file for complete search history.

(56) References Cited

U.S. PATENT DOCUMENTS

| | | | |
|---|---|---|---|
| 7,133,529 B2* | 11/2006 | Ura | ................................... 381/66 |
| 7,912,230 B2 | 3/2011 | Kawamura et al. | |
| 2005/0254640 A1 | 11/2005 | Ohki et al. | |
| 2006/0227978 A1 | 10/2006 | Truong et al. | |
| 2007/0104335 A1 | 5/2007 | Shi et al. | |
| 2008/0285774 A1* | 11/2008 | Kanamori et al. | ........... 381/94.3 |

FOREIGN PATENT DOCUMENTS

| | | | |
|---|---|---|---|
| CN | 1741686 A | | 3/2006 |
| JP | 2000-354292 A | | 12/2000 |

(Continued)

OTHER PUBLICATIONS

European Extended Search Report issued in European application No. EP10799870.0, dated Dec. 17, 2013.

(Continued)

*Primary Examiner* — Vivian Chin
*Assistant Examiner* — Friedrich W Fahnert
(74) *Attorney, Agent, or Firm* — Rossi, Kimms & McDowell LLP

(57) ABSTRACT

A howling canceller is adapted to an acoustic system having a speaker and first and second microphones. The speaker and the first microphone form a first acoustic feedback loop; the speaker and the second microphone form a second acoustic feedback loop. The howling canceller includes a howling suppressing unit for performing suppression processing in such a way that: frequency components at which howling is possibly occurring are detected in each of the sound signals picked up by the first and second microphones; the detected frequency components of the sound signals picked up by the first and second microphones are compared with each other on a per-frequency basis and a frequency component having larger power is detected; and based on the comparison results, the larger power frequency component of at least one of the sound signals picked up by the first and second microphones is suppressed.

13 Claims, 4 Drawing Sheets

(56) References Cited

FOREIGN PATENT DOCUMENTS

| | | |
|---|---|---|
| JP | 2004-023722 A | 1/2004 |
| JP | 2004200883 A | 7/2004 |
| JP | 2004-254016 A | 9/2004 |
| JP | 2005-341129 A | 12/2005 |
| JP | 2006197496 A | 7/2006 |
| JP | 2006-217542 A | 8/2006 |
| JP | 2008-005305 A | 1/2008 |
| JP | 2008-017244 A | 1/2008 |
| WO | 2005/125273 A1 | 12/2005 |

OTHER PUBLICATIONS

English translation of International Preliminary Report on Patentability issued in PCT/JP2010/061923 dated Feb. 16, 2012. Cited in related co-pending U.S. Appl. No. 13/384,395.

Extended European Search Report issued in application No. EP10799871.8, dated Sep. 3, 2013. Cited in related co-pending U.S. Appl. No. 13/384,395.

International Search Report cited in related co-pending unpublished U.S. Appl. No. 13/384,395, filed Jan. 17, 2012.

Co-Pending Unpublished U.S. Appl. No. 13/384,395, filed Jan. 17, 2012.Specification and Drawings. pp. 1-35.

International Search Report for JP/2010/061922, mailing date Sep. 7, 2010.

Notification of the First Office Action issued in CN 201080032205, dated Jan. 6, 2014. English translation provided.

Notification of Second Office Action issued in CN 201080032205, dated Jul. 29, 2014. English translation provided.

Non-Final Office Action issued in U.S. Appl. No. 13/384,395 mailed Jul. 18, 2014.

* cited by examiner

HOWLING CANCELLER

This application is a U.S. National Phase Application of PCT International Application PCT/JP2010/061922, filed on Jul. 14, 2010, which is based on and claims priority from JP 2009-168558, filed on Jul. 17, 2009. The contents of the documents cited in this paragraph are hereby incorporated herein by reference in their entireties.

TECHNICAL FIELD

The invention relates to a howling canceller that suppresses howling occurring in an acoustic feedback loop.

BACKGROUND ART

Under environments in which an acoustic feedback system is formed in a predetermined space where a speaker and a microphone are provided and a loop in which a sound signal picked up by the microphone is emitted from the speaker and the sound signal is again picked up by the microphone is formed, howling is problematic which occurs as a loop gain of a signal of a specific frequency exceeds 1. In order to suppress the howling, a variety of cancellers have been suggested (for example, refer to Patent Document 1).

A howling canceller of Patent Document 1 has a plurality of notch filters and is connected between a microphone and an amplifier provided at a subsequent stage of the microphone. When a frequency component at which the howling occurs is detected, the howling canceller allots the notch filter to the detected frequency, thereby suppressing the howling.

RELATED TECHNICAL DOCUMENTS

Patent Documents

[Patent Document 1] JP-A-2008-017244

SUMMARY OF THE INVENTION

Problems to be Solved

Patent Document 1 discloses a case where the howling is suppressed in a loop in which one microphone and one speaker are provided. Accordingly, when the notch filter is simply allotted to the frequency at which the howling is detected, the howling can be suppressed.

However, under circumstances in which a plurality of microphones is arranged and sound signals picked up by the microphones are synthesized and emitted from the speaker, the acoustic feedback loop is configured for each of the microphones. Hence, it is not possible to simply determine that the howling is occurring in which acoustic feedback loop (sound signal picked up by the microphone).

In this case, generally, the howling canceller of Patent Document 1 is connected to a subsequent stage of each microphone. Then, when the howling occurs in any one of acoustic feedback loops, all the howling cancellers connected to the subsequent stages of the respective microphones allot the notch filters to the same frequencies as the frequency component at which the howling is occurring.

Therefore, the frequency component at which the howling is detected is suppressed even in the acoustic feedback loop in which the howling does not occur. That is, in the acoustic feedback loop in which the howling does not occur, even a frequency component that should not be originally suppressed is suppressed.

Accordingly, an object of the invention is to provide a howling canceller that can attenuate a frequency component at which howling is occurring only for a sound signal picked up by a microphone in which the howling is occurring, under environments in which a synthesized sound signal, which is obtained by synthesizing sound signals picked up by a plurality of microphones, is emitted from a speaker.

Means for Solving the Problems

In order to achieve the above object, according to the invention, there is provided a howling canceller that is adapted to an acoustic system having a speaker and a plurality of microphones. A plurality of acoustic feedback loops are formed by the speaker and each of the microphones. The howling canceller comprises a howling suppressing unit that performs suppression processing of detecting frequency components at which howling is possibly occurring in each of sound signals picked up by the respective microphones, comparing the detected frequency components of the sound signals picked up by the microphones each other on frequency basis and detecting a frequency component having maximum power, and suppressing the frequency component having the maximum power in the sound signal including the frequency component having the maximum power.

Preferably, the howling suppressing unit includes: a howling possibility detection unit that detects the frequency components at which howling is possibly occurring in each of the sound signals picked up by the microphones; and a howling determination unit that compares the frequency components of the sound signals, which are detected by the howling possibility detection unit, each other on the frequency basis and determines the frequency component having maximum power on the frequency basis. Based on a determination result of the howling determination unit, the howling suppressing unit inserts a notch filter for suppressing the frequency component into the sound signal including the determined frequency component.

Preferably, when power of the frequency component in each of the sound signals picked up by the microphones has a predetermined value or larger, the howling possibility detection unit detects the frequency component having the power of the predetermined value or larger, as the frequency component at which the howling is possibly occurring.

Preferably, a plurality of the howling suppressing units are respectively provided between a synthesis unit that synthesizes the sound signals output from the microphones and the microphones.

Preferably, the howling suppressing unit repeatedly performs the suppression processing.

Effects of the Invention

The howling canceller of the invention can suppress only the frequency component of the sound signal at which the howling occurs in the acoustic feedback system having the plurality of acoustic feedback loops. Thereby, the howling canceller can prevent the frequency component, which should not be suppressed, from being suppressed.

DETAILED DESCRIPTION OF ILLUSTRATIVE EMBODIMENTS

First Illustrative Embodiment

Figure 1:
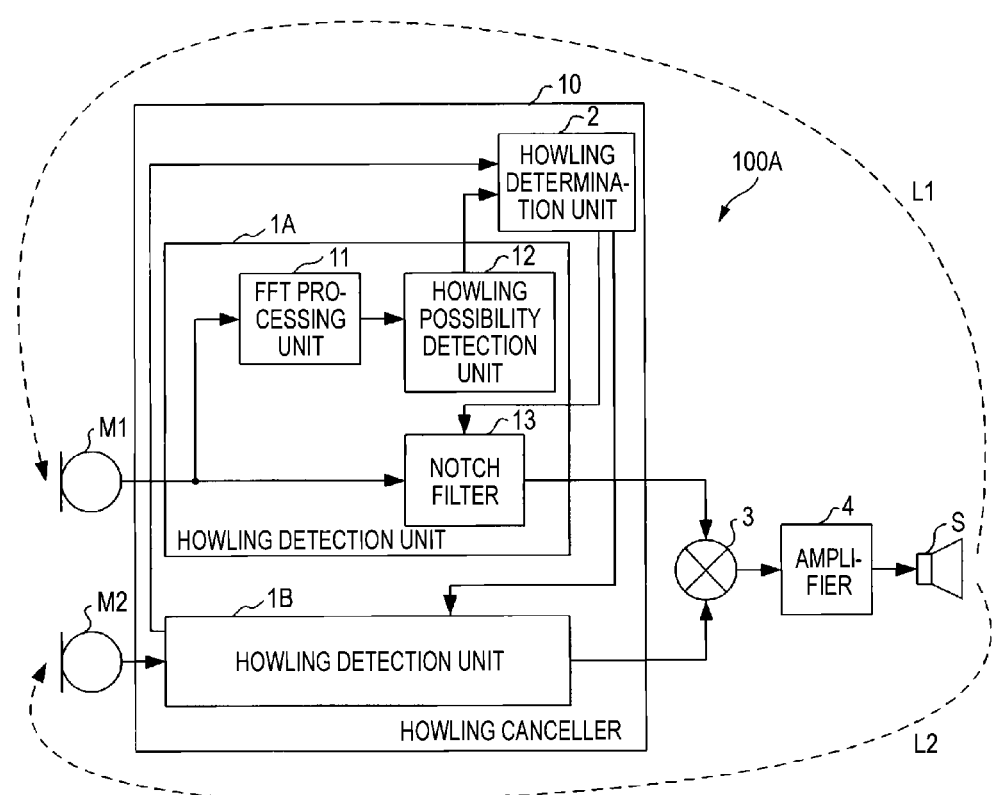
FIG. 1 is a block diagram showing functions and configurations of an acoustic system according to a first illustrative embodiment.

An acoustic system 100A having a howling canceller 10 according to a first illustrative embodiment is described with reference to FIG. 1 and FIGS. 2(A) and 2(B). FIG. 1 is a block diagram showing functions and configurations of the acoustic system. As shown in FIG. 1, the acoustic system 100A includes a microphone M1, a microphone M2, a howling canceller 10, an adder 3, an amplifier 4 and a speaker S.

In the acoustic system 100A, sound signals (hereinafter, also referred to as sound pickup signals) picked up by the microphone M1 and the microphone M2 are added in the adder 3, and the added sound signal is amplified in the amplifier 4 and the amplified signal is output to the speaker S. At this time, in the acoustic system 100A, acoustic feedback loops in which the microphone M1 and the microphone M2 again pick up the sound emitted from the speaker S are formed due to a relation of an arrangement position between the speaker S and the microphones M1, M2 or an environment in which the speaker and the microphones are arranged. Thus, in the acoustic system 100A, since the sound signal (which includes the sound signals picked up by the microphone M1 and the microphone M2) emitted from the speaker S is included in the sound signals picked up by the microphone M1 and the microphone M2, the sound signals picked up by the microphone M1 and the microphone M2 are repeatedly amplified by the amplifier 4, so that a specific frequency component may be strengthened depending on circumstances. As a result, a loop gain of the specific frequency exceeds 1, so that howling occurs. Therefore, in the acoustic system 100A, the howling canceller 10 performs howling suppression processing, thereby suppressing the howling.

Here, since one speaker and two microphones are present in the acoustic system 100A, two acoustic feedback loops L1, L2 are present. The acoustic feedback loop L1 has the microphone M1, the howling canceller 10, the adder 3, the amplifier 4 and the speaker S. The acoustic feedback loop L2 has the microphone M2, the howling canceller 10, the adder 3, the amplifier 4 and the speaker S.

The microphone M1 and the microphone M2 output the sound signals to the howling canceller 10, respectively.

The howling canceller 10 has a howling detection unit 1A, a howling detection unit 1B and a howling determination unit 2 and suppresses the howling that is occurring in the acoustic feedback loop L1 and the acoustic feedback loop L2. The sound pickup signal from the microphone M1 is input to the howling detection unit 1A of the howling canceller 10 and the sound pickup signal from the microphone M2 is input to the howling detection unit 1B of the howling canceller 10. In the meantime, since the howling detection unit 1A and the howling detection unit 1B have the same function and configuration, they are described as a howling detection unit 1.

The howling detection unit 1 has an FFT processing unit 11, a howling possibility detection unit 12 and a notch filter 13. The sound pickup signal is input to the FFT processing unit 11 and the notch filter 13.

The FFT processing unit 11 is a fast Fourier transform processing circuit, converts the sound pickup signal, which is a function of a time domain, into a sound pickup signal that is a function of a frequency domain, and outputs the same to the howling possibility detection unit 12.

When power of a frequency component has a predetermined value or larger, for example, the howling possibility detection unit 12 detects that the howling is possibly occurring at the corresponding frequency. The howling possibility detection unit 12 outputs information of the frequency components at which the howling shown in FIGS. 2(A) and 2(B) is possibly occurring to the howling determination unit 2. FIGS. 2(A) and 2(B) show examples of the frequency components at which the howling is possibly occurring, in which a horizontal axis indicates a frequency and a vertical axis indicates a power value. FIG. 2(A) shows the sound signal picked up by the microphone M1 and FIG. 2(B) shows the sound signal picked up by the microphone M2.

Figure 2:
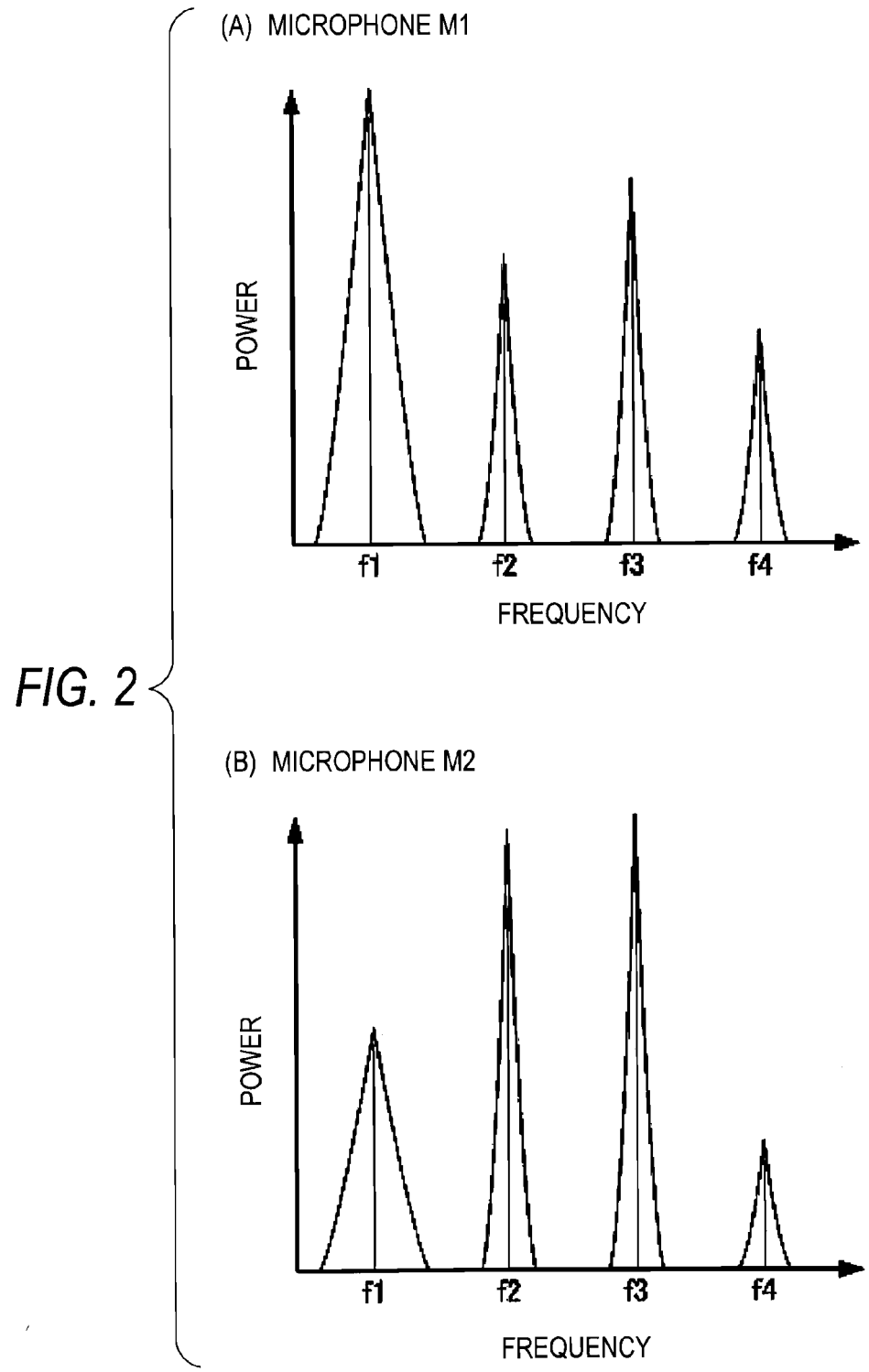
FIGS. 2(A) and 2(B) show examples of frequency components at which howling is possibly occurring.

The howling determination unit 2 compares the frequency components each other, which are input from the respective howling possibility detection units 12 of the howling detection unit 1A and the howling detection unit 1B, and determines a frequency component having larger power (for example, frequency components f1, f4 of the microphone M1 in FIG. 2(A) and frequency components f2, f3 of the microphone M2 in FIG. 2(B)) on a per-frequency basis. The howling determination unit 2 determines that the larger power frequency component corresponds to the frequency component becoming the howling, and sets coefficients in the respective notch filters 13 of the howling detection unit 1A and the howling detection unit 1B so as to suppress the larger power frequency components, individually.

The notch filter 13 is an adaptive IIR filter, for example, and rapidly decreases a gain of a narrow band frequency component to suppress the frequency component. The notch filter 13 outputs a sound signal, in which the larger power frequency component (frequency component at which the howling is occurring) is suppressed from the sound pickup signal, to the adder 3. For example, in the examples of FIGS. 2(A) and 2(B), the notch filter 13 of the howling detection unit 1A attenuates the frequency components f1, f4 without attenuating the frequency components f2, f3 and outputs the sound signal to the adder 3. The notch filter 13 of the howling detection unit 1B attenuates the frequency components f2, f3 without attenuating the frequency components f1, f4 and outputs the sound signal to the adder 3.

The adder 3 adds the input sound signals and outputs the added signal to the amplifier 4. That is, the adder 3 adds the sound signal, in which the frequency components becoming the howling are suppressed from the sound signal picked up by the microphone M1, and the sound signal, in which the frequency components becoming the howling are suppressed from the sound signal picked up by the microphone M2.

The amplifier 4 amplifies the sound signal input from the adder 3 and outputs the amplified sound signal to the speaker S.

The speaker S emits the sound, based on the input sound signal.

Since the howling canceller 10 can specify the frequency components at which the howling is occurring in each of the sound signals picked up by the microphones, it is possible to suppress only the frequency components at which the howling is occurring in each of the sound signals picked up by the microphones. That is, regarding the frequency at which the howling is occurring in the sound signal picked up by the other microphone, the howling canceller 10 does not erroneously suppress the frequency component of the sound signal picked up by a microphone at which the howling does not occur. As a result, the howling canceller 10 does not suppress the frequency components of the sound signals beyond necessity, so that the sound signal to be output is less deteriorated.

Figure 3:
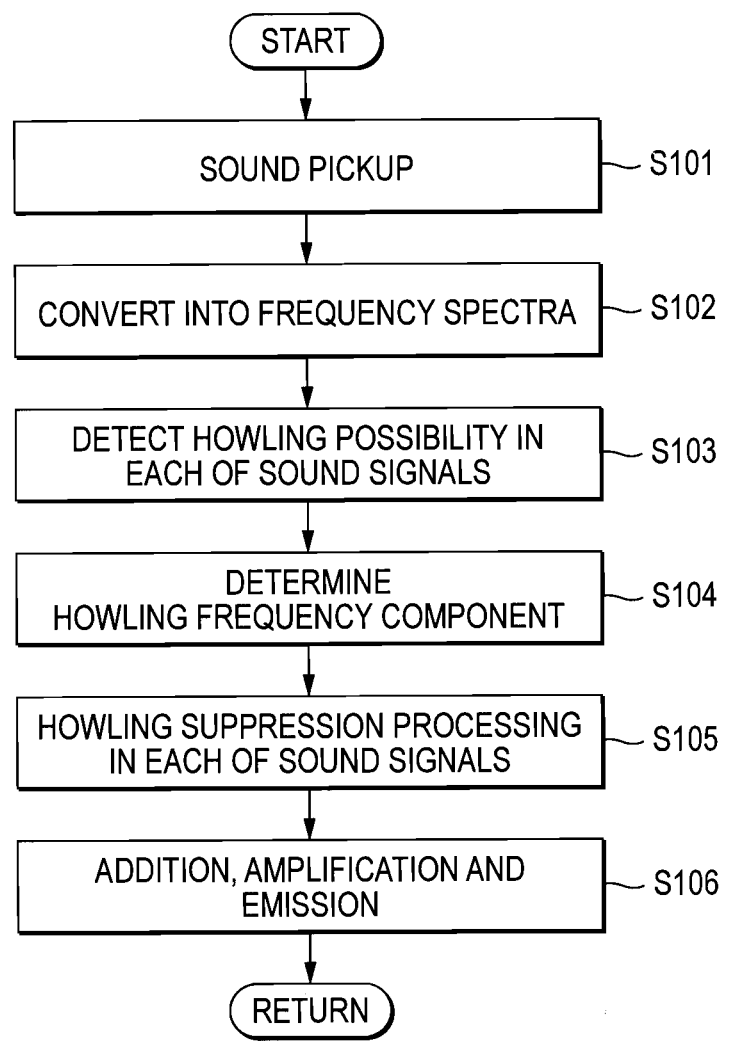
FIG. 3 is a flowchart showing howling suppression processing.

Also, as shown in FIG. 3, the acoustic system 100A repeatedly executes the howling suppression processing. FIG. 3 is a flowchart showing the howling suppression processing.

As shown in FIG. 3, the microphone M1 picks up surrounding sound to generate a sound signal and outputs the sound signal to the FFT processing unit 11 and the notch filter 13 of the howling detection unit 1A of the howling canceller 10. Also, the microphone M2 picks up a surrounding sound to generate a sound signal and outputs the sound signal to the FFT processing unit 11 and the notch filter 13 of the howling detection unit 1B (S101).

The respective FFT processing units 11 of the howling detection unit 1A and the howling detection unit 1B convert the input sound signals into frequency spectra and output the converted frequency spectra to the howling possibility detection units 12, respectively (S102).

The respective howling possibility detection units 12 of the howling detection unit 1A and the howling detection unit 1B detect that the howling is possibly occurring at the frequency components having power of a predetermined value or larger of the frequency spectra and output the detected frequency components to the howling determination unit 2, respectively (S103).

The howling determination unit 2 compares the respective frequency components input from the respective howling possibility detection units 12 of the howling detection unit 1A and the howling detection unit 1B and determines the lager power frequency component on a per-frequency basis (S104).

The howling determination unit 2 individually sets coefficients in the respective notch filters 13 of the howling detection unit 1A and the howling detection unit 1B so as to suppress the larger power frequency components (S105).

The respective notch filters 13 of the howling detection unit 1A and the howling detection unit 1B output the sound signals, in which the larger power frequency components are suppressed from the sound pickup signals input from the microphone M1 and the microphone M2, to the adder 3. The sound signal added in the adder 3 is amplified in the amplifier 4 and then output to the speaker S (S106). Then, returning to the process of S101, the processes are sequentially repeated.

Like this, by repeatedly performing the howling suppression processing, the howling canceller 10 can suppress even the frequency component that has not been suppressed in one howling suppression processing. Accordingly, the howling canceller 10 can suppress the howling that is occurring in the acoustic system 100A, correctly and securely.

For example, for a case where the howling of the frequency component f1 of FIGS. 2(A) and 2(B) is caused due to not only the acoustic feedback loop L1 but also the acoustic feedback loop L2, even when the howling suppression processing is performed for the frequency component f1 of the acoustic feedback loop L1 in the above processing, the frequency component f1 of the acoustic feedback loop L2 remains. However, by repeatedly performing the howling suppression processing, it is possible to detect even the howling of the frequency component f1 of the acoustic feedback loop L2, which could not been suppressed, so that it is possible to suppress the howling.

In the meantime, the number of the microphones is not limited to two and may be three or more. In this case, since the acoustic feedback loops corresponding to the number of the microphones are formed in the acoustic system 100A, the howling canceller 10 has only to include the howling detection units 1 corresponding to the number of the acoustic feedback loops.

Second Illustrative Embodiment

Figure 4:
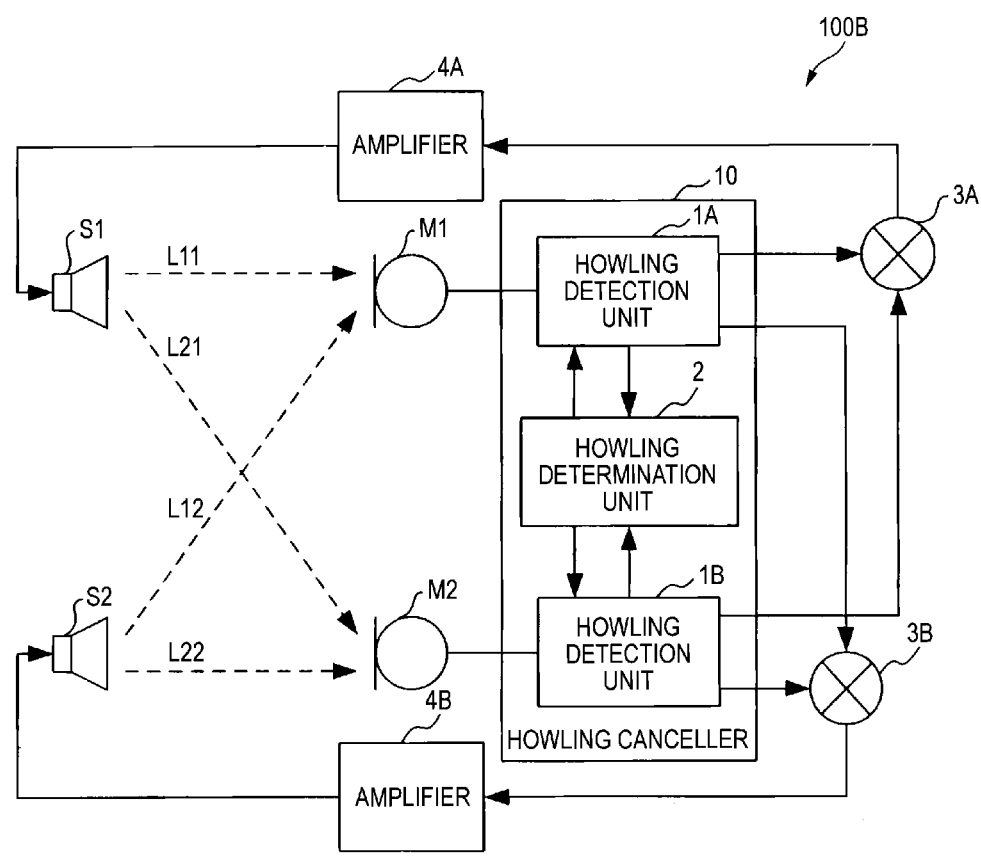
FIG. 4 is a block diagram showing functions and configurations of an acoustic system according to a second illustrative embodiment.

In a second illustrative embodiment, the howling canceller 10 is applied to an acoustic system 100B having two speakers and two microphones. The second illustrative embodiment is described with reference to FIG. 4. FIG. 4 is a block diagram showing functions and configurations of the acoustic system according to the second illustrative embodiment. As shown in FIG. 4, the acoustic system 100B includes the microphone M1, the microphone M2, the howling canceller 10, an adder 3A, an adder 3B, an amplifier 4A, an amplifier 4B, a speaker S1 and a speaker S2.

The acoustic system 100B shown in FIG. 4 adds sound signals picked up by the microphone M1 and the microphone M2 in the adder 3A and the adder 3B, respectively, amplifies the sound signal, which is output from the adder 3A, in the amplifier 4A and amplifies the sound signal, which is output from the adder 3B, in the amplifier 4B. Then, the acoustic system 100B outputs the sound signal amplified in the amplifier 4A to the speaker S1 and outputs the sound signal amplified in the amplifier 4B to the speaker S2. At this time, in the acoustic system 100B, acoustic feedback loops in which the microphone M1 and the microphone M2 again pick up the sounds emitted from the speaker S1 and the speaker S2 are formed.

In this case, in the acoustic system 100B, since the sound signals (which include the sound signals picked up by the microphone M1 and the microphone M2) emitted from the speaker S1 and the speaker S2 are included in the sound signals picked up by the microphone M1 and the microphone M2, the sound signals picked up by the microphone M1 and the microphone M2 are repeatedly amplified by the amplifier 4A and the amplifier 4B, so that a specific frequency component may be strengthened depending on circumstances. As a result, when a loop gain of the specific frequency exceeds 1, howling occurs. Therefore, in the acoustic system 100B, the howling canceller 10 performs howling suppression processing, thereby suppressing the howling.

Here, since two speakers and two microphones are present in the acoustic system 100B, acoustic feedback loops L11, L12, L21, L22 are realistically formed. The acoustic feedback loop L11 has the microphone M1, the howling canceller 10, the adder 3A, the amplifier 4A and the speaker S1. The acoustic feedback loop L12 has the microphone M1, the howling canceller 10, the adder 3B, the amplifier 4B and the speaker S2. The acoustic feedback loop L21 has the microphone M2, the howling canceller 10, the adder 3A, the amplifier 4A and the speaker S1. The acoustic feedback loop L22 has the microphone M2, the howling canceller 10, the adder 3B, the amplifier 4B and the speaker S2.

The sound signals picked up by the microphone M1 and the microphone M2 are respectively output to the howling detection unit 1A and the howling detection unit 1B of the howling canceller 10. The sound signal picked up by the microphone M1 includes the sound signal (sound signal having transmitted through the acoustic feedback loop L11) output from the speaker S1 and the sound signal (sound signal having transmitted through the acoustic feedback loop L12) output from the speaker S2. The sound signal picked up by the microphone M2 includes the sound signal (sound signal having transmitted through the acoustic feedback loop L21) output from the speaker S1 and the sound signal (sound signal having transmitted through the acoustic feedback loop L22) output from the speaker S2.

The howling detection unit 1A detects, from the sound signal picked up by the microphone M1, frequency components at which the howling is possibly occurring, and the howling detection unit 1B detects, from the sound signal picked up by the microphone M2, frequency components at which the howling is possibly occurring. The howling determination unit 2 compares the frequency components detected by the howling detection unit 1A and the howling detection unit 1B, respectively, and determines a frequency component having larger power on a per-frequency basis. The howling determination unit 2 sets coefficients in the notch filter 13 of the howling detection unit 1A and the notch filter 13 of the howling detection unit 1B so as to suppress the larger power frequency components.

Like this, even for the acoustic system 100B having the plurality of speakers, the howling canceller 10 can specify the frequency components at which the howling is occurring in each of the sound signals picked up by the microphones. Therefore, the howling canceller 10 can suppress only the sound signal picked up by a microphone, which includes the frequency component at which the howling is occurring in the sound signal picked up by the other microphone. That is, the howling canceller 10 does not suppress the frequency component of the same frequency as the frequency component at which the howling is occurring, from the sound signal picked up by the microphone for which it is determined that the frequency component at which the howling is occurring is not included. As a result, the howling canceller 10 does not suppress the frequency components of the sound signals beyond necessity, so that the sound signal to be output is less deteriorated.

Also, like the first illustrative embodiment, it is possible to suppress the howling more correctly and securely by repeating the howling suppression processing.

In the meantime, the number of the microphones and the number of the speakers are not limited to two and may be three or more. In this case, the howling canceller 10 has only to include the howling detection units 1 corresponding to the number of the microphones.

In the below, the operational effects of the invention are described.

The howling canceller of the invention is applied to an acoustic system having one or more speakers and a plurality of microphones. The acoustic system has a plurality of acoustic feedback loops in which the sound is emitted from the speakers, based on the sound signals picked up by the microphones, and the sound emitted from the speakers is again picked up by the microphones.

The howling canceller has the howling suppressing unit that performs the howling suppression processing. The howling suppressing unit detects the frequency components at which the howling is possibly occurring in each of the sound signals picked up by the microphones. For example, the howling suppressing unit performs the FFT processing in each of the sound signals picked up by the microphones and detects the frequency components having power of a predetermined value or larger, as the frequency component at which the howling is possibly occurring. The howling suppressing unit compares the detected frequency components each other in each of the sound signals picked up by the microphones, detects the sound signal having larger power (maximum power) on a per-frequency basis and suppresses the frequency components at which the howling is occurring in each of the sound signals.

Thereby, in the acoustic system having the plurality of acoustic feedback loops, the howling canceller can suppress only the frequency components of the sound signal picked up by the microphone, at which the howling is occurring, and does not suppress the frequency components of the sound signal picked up by the microphone, at which the howling does not occur. Therefore, the howling canceller can suppress the occurring howling without substantially deteriorating the sound signal.

Also, the howling suppressing unit of the howling canceller of the invention has the howling detection unit and the howling determination unit. The howling detection unit detects the frequency components at which the howling is possibly occurring in each of the sound signals picked up by the microphones. The howling determination unit detects, from the frequency components at which the howling is possibly occurring, the frequency component having larger power on a per-frequency basis. The howling determination unit regards the detected frequency component having larger power on a per-frequency basis as the frequency component that causes the howling, and determines the sound pickup signals of the microphones becoming the howling on a per-frequency basis. Based on the determination result of the howling determination unit, the howling detection unit inserts the notch filters for each of the acoustic feedback loops so as to suppress the frequency components for which it is determined that the howling is occurring.

Also, the howling canceller of the invention connects the howling suppressing unit just after the microphones, respectively.

Thereby, since the howling canceller performs the howling suppression processing before the sound signals of the microphones are synthesized, it is possible to suppress the frequency components becoming the howling in each of the sound signals picked up by the microphones. The howling canceller can suppress the frequency components becoming the howling in each of the microphones.

Also, the howling canceller of the invention repeatedly performs the howling suppression processing.

Thereby, even when the howling exists which could not been suppressed in the previous howling suppression processing, the howling canceller can repeat the howling suppression processing, so that it is possible to always suppress the howling.

The illustrative embodiments simply show the representative examples of the invention and the invention is not limited to the illustrative embodiments. That is, the illustrative embodiments can be variously modified and implemented without departing from the gist of the invention.

The invention is based on the Japanese Patent Application (Patent Application No. 2009-168558) filed on Jul. 17, 2009, the disclosures of which are incorporated herein by reference.

INDUSTRIAL APPLICABILITY

Under environments in which the synthesized sound signal, which is obtained by synthesizing the sound signals picked up by the microphones, is emitted from the speaker, it is possible to provide the howling canceller that attenuates the frequency components at which the howling is occurring, only for the sound signal picked up by the microphone at which the howling is occurring.

DESCRIPTION OF REFERENCE NUMERALS

1, 1A, 1B: howling detection unit
10: howling canceller
100A, 100B: acoustic system
11: FFT processing unit
12: howling possibility detection unit
13: notch filter 2: howling determination unit
3, 3A, 3B: adder
4, 4A, 4B: amplifier
L1, L2, L11, L12, L21, L22: acoustic feedback loop
M1, M2: microphone
S, S1, S2: speaker

The invention claimed is:

1. A howling canceller that is adapted to an acoustic system having a speaker and a plurality of microphones,
wherein a plurality of acoustic feedback loops are formed by the speaker and each of the microphones; and
wherein the howling canceller comprises a howling suppressing unit that performs suppression processing of detecting frequency components at which howling is possibly occurring in each of sound signals picked up by the respective microphones, comparing the detected frequency components of the sound signals picked up by the microphones with each other on frequency basis and detecting a frequency component having maximum power, and suppressing the frequency component having the maximum power in a first sound signal, among the sound signals, including the frequency component having the maximum power without suppressing the same frequency component in a second sound signal among the sound signals,
wherein the howling suppressing unit includes:
a howling possibility detection unit that detects the frequency components at which howling is possibly occurring in each of the sound signals picked up by the microphones; and
a howling determination unit that compares the frequency components of the sound signals, which are detected by the howling possibility detection unit, with each other on the frequency basis and determines the frequency component having maximum power on the frequency basis; and
wherein based on a determination result of the howling determination unit, the howling suppressing unit suppresses the frequency component in the sound signal including the determined frequency component.

2. The howling canceller according to claim 1,
wherein based on the determination result of the howling determination unit, the howling suppressing unit inserts a notch filter for suppressing the frequency component into the sound signal including the determined frequency component.

3. The howling canceller according to claim 2, wherein when power of the frequency component in each of the sound signals picked up by the microphones is equal to or greater than a predetermined value, the howling possibility detection unit detects the frequency component having the power equal to or greater than the predetermined value, as the frequency component at which the howling is possibly occurring.

4. The howling canceller according to claim 1, wherein a plurality of the howling suppressing units are respectively provided between a synthesis unit, which synthesizes the sound signals output from the microphones, and the microphones.

5. The howling canceller according to claim 1, wherein the howling suppressing unit repeatedly performs the suppression processing.

6. A method of cancelling howling in an acoustic system having a speaker and a plurality of microphones, the speaker and each of the microphones forming a plurality of acoustic feedback loops, the method comprising:
performing suppression processing of detecting frequency components at which howling is possibly occurring in each of sound signals picked up by the respective microphones;
comparing the detected frequency components of the sound signals picked up by the microphones with each other on frequency basis;
detecting a frequency component having maximum power; and
suppressing the frequency component having the maximum power in a first sound signal, among the sound signals, including the frequency component having the maximum power without suppressing the same frequency component in a second sound signal among the sound signals.

7. The method according to claim 6, wherein suppressing the frequency component having the maximum power in the first sound signal comprises using a notch filter.

8. The method according to claim 6, wherein the suppressing is repeatedly performed.

9. An apparatus, comprising:
a first howling detector configured to receive a first signal output from a first microphone, detect whether howling is possibly occurring at one or more frequency components of the first signal, and output the one or more frequency components of the first signal at which howling is possibly occurring;
a second howling detector configured to receive a second signal output from a second microphone, detect whether howling is possibly occurring at one or more frequency components of the second signal, and output the one or more frequency components of the second signal at which howling is possibly occurring; and
a howling determiner configured to receive the one or more frequency components of the first signal at which howling is possibly occurring and the one or more frequency components of the second signal at which howling is possibly occurring, to compare the received frequency components with each other on a per-frequency basis, to determine frequency components having a larger power as frequency components at which howling is occurring, and to output a result of the determination to the first and second howling detectors such that the first howling detector suppresses the frequency component having the larger power in the first sound signal while the second howling detector does not suppress the same frequency component of the second signal that is being suppressed by the first howling detector, and the second howling detector suppresses the frequency component having the larger power in the second sound signal while the first howling detector does not suppress the same frequency component of the first signal that is being suppressed by the second howling detector.

10. The apparatus of claim 9, wherein the first howling detector comprises:
a fast fourier transform processor configured to receive the first signal from the first microphone and output the first signal as a function of a frequency domain;
a howling possibility detector configured to receive the output of the fast fourier transform processor and to detect that howling is possibly occurring at the one or more frequency components of the first signal when a power of the detected frequency component is greater than or equal to a threshold value; and
a notch filter configured to suppress the frequency component having the larger power in the first sound signal.

11. The apparatus of claim 10, wherein the second howling detector comprises:
- a fast fourier transform processor configured to receive the second signal from the second microphone and output the second signal as a function of a frequency domain;
- a howling possibility detector configured to receive the output of the fast fourier transform processor and to detect that howling is possibly occurring at the one or more frequency components of the second signal when a power of the detected frequency component is greater than or equal to a threshold value; and
- a notch filter configured to suppress the frequency component having the larger power in the second sound signal.

12. The apparatus of claim 11, wherein the notch filter of the first howling detector is configured to provide the filtered first signal to a speaker via an adder, and the notch filter of the second howling detector is configured to provide the filtered second signal to the speaker via the adder.

13. The apparatus of claim 11, wherein the notch filter of the first howling detector is configured to provide the filtered first signal to a first speaker via a first adder and to a second speaker via a second adder, and the notch filter of the second howling detector is configured to provide the filtered second signal to the first speaker via the first adder and to the second speaker via the second adder.

* * * * *